(12) United States Patent
Takedomi et al.

(10) Patent No.: US 6,802,529 B2
(45) Date of Patent: Oct. 12, 2004

(54) AIRBAG SYSTEM

(75) Inventors: Akifumi Takedomi, Yokaichi (JP); Takeshi Kurimoto, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/671,724

(22) Filed: Sep. 29, 2003

(65) Prior Publication Data

US 2004/0160040 A1 Aug. 19, 2004

(30) Foreign Application Priority Data

Feb. 17, 2003 (JP) ........................................ 2003-038418

(51) Int. Cl.$^7$ .............................................. B60R 21/24
(52) U.S. Cl. .................. 280/729; 280/730.2; 280/743.1
(58) Field of Search .............................. 280/729, 730.2, 280/743.1

(56) References Cited

U.S. PATENT DOCUMENTS

| | | | | |
|---|---|---|---|---|
| 3,473,824 A | * | 10/1969 | Carey et al. | ................. 280/729 |
| 3,767,225 A | * | 10/1973 | Mazelsky | .................... 280/729 |
| 4,360,223 A | * | 11/1982 | Kirchoff | ..................... 280/729 |
| 5,464,250 A | | 11/1995 | Sato | |
| 5,692,774 A | | 12/1997 | Acker et al. | |
| 5,848,804 A | | 12/1998 | White, Jr. et al. | |
| 5,906,391 A | | 5/1999 | Weir et al. | |
| 6,032,977 A | | 3/2000 | Reh et al. | |
| 6,062,594 A | | 5/2000 | Asano et al. | |
| 6,142,517 A | | 11/2000 | Nakamura et al. | |
| 6,349,964 B1 | | 2/2002 | Acker et al. | |

FOREIGN PATENT DOCUMENTS

| | | | |
|---|---|---|---|
| JP | 3038479 | 4/1987 | |
| JP | 4-244453 | * 9/1992 | .............. 280/743.1 |
| JP | 5-4553 | 1/1993 | |
| JP | 5-131889 | 5/1993 | |
| JP | 8-67228 | 3/1996 | |
| JP | 9-39710 | 2/1997 | |
| JP | 9-136595 | 5/1997 | |
| JP | 10-175499 | 6/1998 | |
| JP | 10-181498 | 7/1998 | |
| JP | 10-273010 | 10/1998 | |
| JP | 2000-85515 | 3/2000 | |
| JP | 2001-520604 | 10/2001 | |
| JP | 2002-145003 | 5/2002 | |

* cited by examiner

*Primary Examiner*—Eric Culbreth
(74) *Attorney, Agent, or Firm*—Manabu Kanesaka

(57) ABSTRACT

An airbag system includes an airbag, and a gas generator for generating gas to inflate the airbag. The airbag further includes an inner bag to be inflated first and disposed inside the airbag, and a check valve for preventing the gas from flowing from the inner bag to the airbag. In the airbag system, after the inner bag is inflated, the gas is supplied to the airbag to inflate the same.

6 Claims, 5 Drawing Sheets

Gas

AIRBAG SYSTEM

BACKGROUND OF THE INVENTION AND RELATED ART STATEMENT

The present invention relates to an airbag system for protecting an occupant in a vehicle such as a car in an event of a car crash. More particularly, the present invention relates to an airbag system including an airbag in which an interior thereof is partitioned into a plurality of chambers.

In an airbag system, a gas generator inflates an airbag toward an occupant, and the inflated airbag receives a body of the occupant. Japanese Patent Publication (KOKAI) No. 2000-177527 has disclosed a side airbag system in which a lower part of the airbag is inflated at an inner pressure higher than that of an upper part for receiving a lumbar part of the occupant. FIG. 7 is a side view of a seat equipped with the side airbag system disclosed in the reference, and FIG. 8 is an enlarged sectional view showing a section 8 in FIG. 7.

An airbag 18 is partitioned into an upper chamber 20 and a lower chamber 22 with a seam 24. A rear end of the seam 24 is located slightly away from a rear rim of the airbag 18, and a cylindrical housing 30 is placed in a space between the rear end of the seam 24 and the rear rim of the airbag 18. A rod-shaped gas generator 36 is placed in the cylindrical housing 30. Upper and lower ends of the cylindrical housing 30 are formed with pipe clips 32 and 34 for fixing the gas generator 36. The pipe clips 32 and 34 seal portions between the gas generator 36 and the cylindrical housing 30. The pipe clips 32 and 34 are attached to mounting sections 26 of a seat back 14.

The cylindrical housing 30 has upper-chamber discharge ports 42 for discharging gas from the gas generator 36 into the upper chamber 20, and lower-chamber discharge ports 44 for discharging gas into the lower chamber 22. Each of the lower-chamber discharge ports 44 has an opening larger than those of the upper-chamber discharge ports 42. Therefore, when the gas generator 36 is activated to inflate the airbag 18, an inner pressure of the upper chamber 20 becomes about 0.5 bar and an inner pressure of the lower chamber 22 becomes about 1.5 bar.

In Japanese Patent Publication No. 2000-177527, the side airbag system has the cylindrical housing 30. When the lower chamber 22 of the airbag 18 receives the occupant, the gas in the lower chamber 22 flows into the upper chamber 20 through the cylindrical housing 30. Therefore, it is difficult to maintain the gas pressure in the lower chamber 22 at a high level for long time.

In view of the problem described above, an object of the present invention is to provide an airbag system in which it is easy to maintain a gas pressure at a part of an airbag, for example, a lower part of the airbag, at a high level for sufficiently long time.

Further objects and advantages of the invention will be apparent from the following description of the invention.

SUMMARY OF THE INVENTION

According to the present invention, an airbag system includes an airbag having a surface facing an occupant and an opposite surface facing a car body in an inflated state, and a gas generator for generating gas to inflate the airbag. The airbag further includes an inner bag to be inflated first and a check valve for preventing the gas from flowing from the inner bag to the airbag. In the airbag system, after the inner bag is inflated, the gas is supplied only to the airbag to inflate the same.

According to the present invention, when the gas generator is activated, the inner bag is inflated first. The inner bag may be disposed at a lower part of the airbag, so that the lower part of the airbag is inflated at an early stage. In the airbag system, the check valve is provided for preventing the gas from flowing from the inner airbag to the airbag. Therefore, it is possible to maintain an inner pressure of the inner bag at a high level for a long time. The airbag system can protect an occupant not only in a case of a car crash but also roll over.

According to the present invention, the airbag system may further include connection means for connecting the inner bag and the gas generator. The connection means disconnects the inner bag from the gas generator when the gas pressure in the inner bag exceeds a predetermined value, so that the gas generator supplies the gas only to the airbag.

According to the present invention, the inner bag may be connected to the gas generator through the connection means. When the gas pressure in the inner bag exceeds a predetermined value, the connection means is released.

According to the present invention, the connection means may be an extension extending from a gas inlet port of the inner bag and having a tear seam. The tear seam is torn off to separate the extension from the inner bag when the gas pressure in the inner bag exceeds a predetermined value. With such a structure, when the gas pressure in the inner bag exceeds the predetermined value, the inner bag is securely separated from the gas generator and the gas generator quickly inflates the airbag.

BRIEF DESCRIPTION OF THE DRAWINGS

FIGS. 2(a) and 2(b) are views of an airbag, wherein FIG. 2(a) is a sectional view of the airbag in the middle of inflation; and FIG. 2(b) is a sectional view taken along line 2(b)—2(b) in FIG. 1;

DETAILED DESCRIPTION OF PREFERRED EMBODIMENTS

Figure 1:
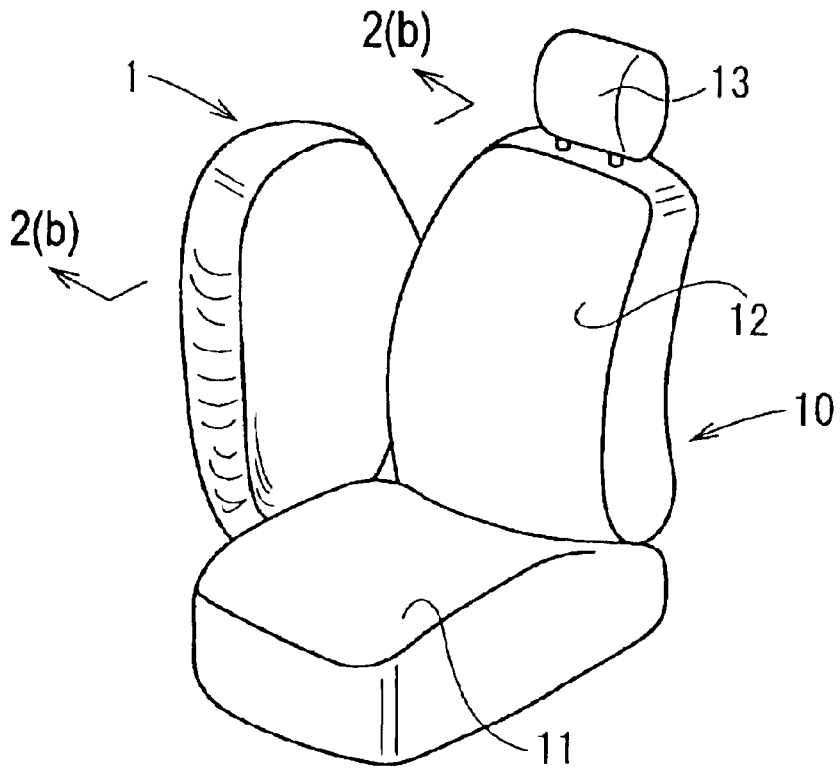
FIG. 1 is a perspective view of a car seat equipped with a side airbag system according to an embodiment of the present invention.
Figure 2A:
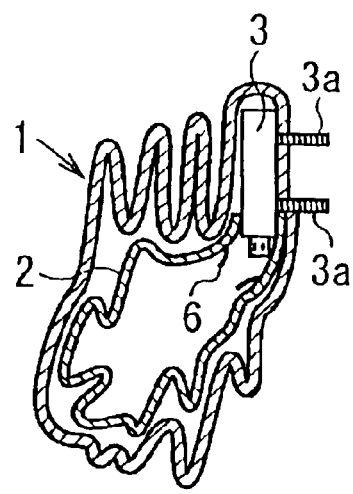
Figure 2B:
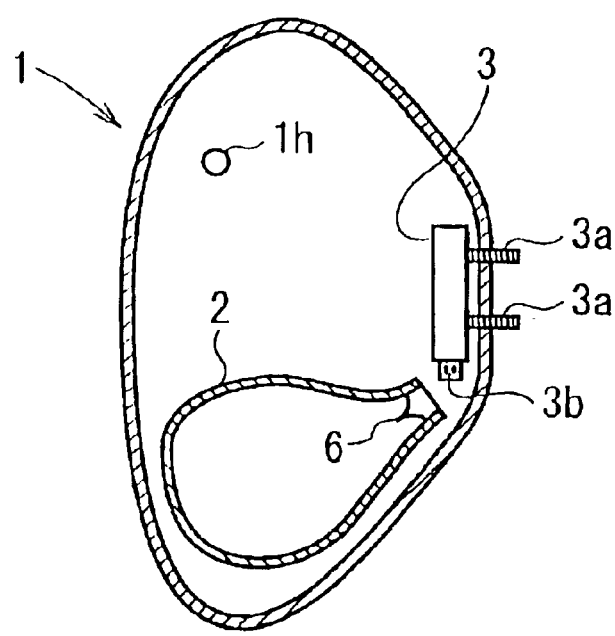
Figure 3A:
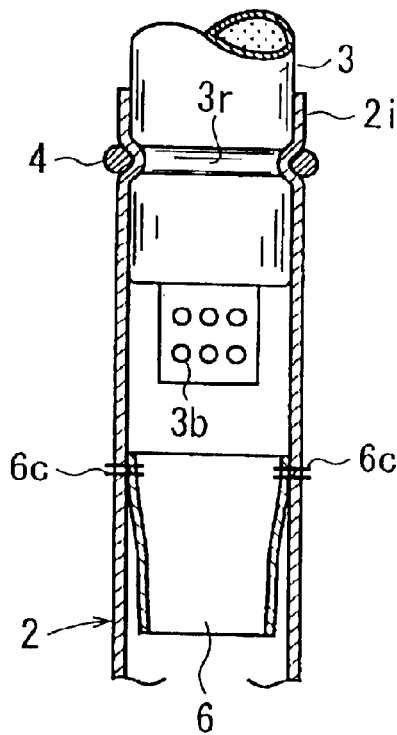
FIGS. 3(a) and 3(b) are sectional views of a connecting portion between an inner bag and a gas generator.
Figure 3B:
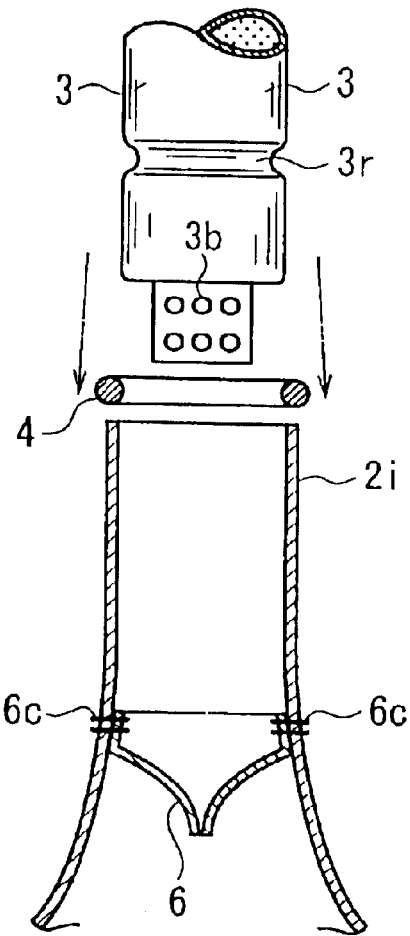
Figure 4A:
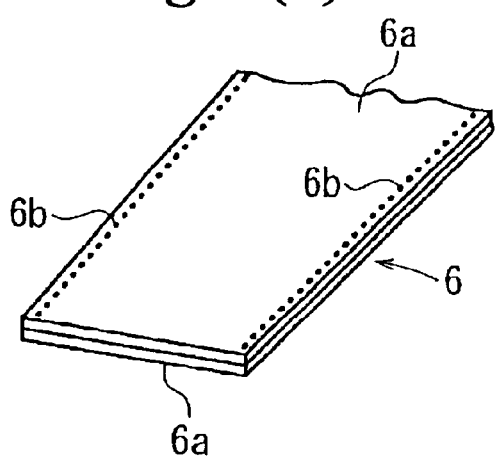
FIGS. 4(a) and 4(b) are perspective views of a check valve of the airbag.
Figure 4B:
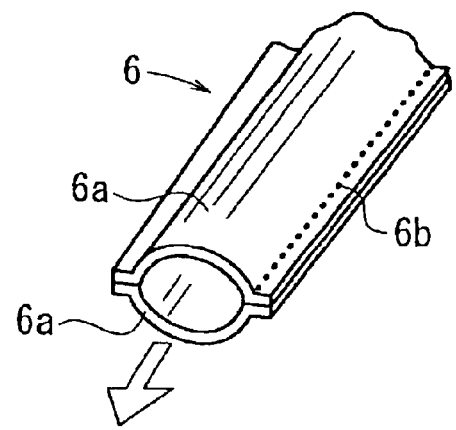

Hereunder, embodiments of the present invention will be described with reference to the accompanying drawings. FIG. 1 is a perspective view of a car seat equipped with a side airbag system according to an embodiment of the present invention. FIGS. 2(a) and 2(b) are views of an airbag, wherein FIG. 2(a) is a sectional view of the airbag in the middle of inflation; and FIG. 2(b) is a sectional view thereof taken along line 2(b)—2(b) in FIG. 1. FIGS. 3(a) and 3(b) are sectional views of a connecting portion between an inner bag and a gas generator. FIGS. 4(a) and 4(b) are perspective views of a check valve of the airbag As shown in FIG. 1, an airbag 1 is inflated along a seat 10 adjacent to a window. The seat 10 includes a seat cushion 11, a seat back 12, and a headrest 13. A casing (not shown) of the side airbag system is provided at a side of the seat back 12, and the airbag 1 is housed in the casing in a folded state and covered with a module cover (not shown). A vent hole 1h is provided at an upper part of the airbag 1.

Two sheet materials such as cloths and resin sheets (cloths in the embodiment) are overlapped and peripheral edges thereof are stitched together to form the airbag 1 in a bag shape. An inner bag 2 is disposed inside the airbag 1 at a lower portion thereof. In the embodiment, the inner bag 2 is also made of a cloth. A gas inlet port 2i of the inner bag 2 is secured to a gas generator 3 with a ring spring 4.

The gas generator 3 is formed in a rod shape, and a longitudinal direction thereof is aligned vertically. The gas generator 3 includes gas jet ports 3b. The gas inlet port 2i of the inner bag 2 is fitted onto the gas generator 3 from a side of the gas jet ports 3b, and the ring spring 4 is fitted on the gas inlet port 2i. The ring spring 4 engages a groove 3r formed around a periphery of the gas generator 3 to attach the inner bag 2 to the gas generator 3.

Two stud bolts 3a projecting from the gas generator 3 pass through the rear rim of the airbag 1 backwardly. The stud bolts 3a are fastened to the casing of the side airbag system with nuts, so that the gas generator 3 and the airbag 1 are attached to the casing.

A check valve 6 is provided at the inner bag 2 adjacent to the gas inlet port 2i for preventing the gas from flowing out of the inner bag 2. As shown in FIGS. 4(a) and 4(b), two sheets 6a are overlapped together, and both sides thereof are stitched together with seams 6b to form the check valve 6. It is also possible to fold one sheet and stitch one side thereof to form the check valve 6.

One end of the check valve 6 is sewn to the inner bag 2 at an entire circumference thereof. When the gas generator 3 is not activated, the sheets 6a of the check valve 6 overlap with each other, as shown in FIG. 4(a). When the gas generator 3 ejects the gas, the check valve 6 is inflated into a substantially cylindrical shape, as shown in FIG. 4(b), so that the gas passes through the check valve 6. When the gas is going to flow out of the inner bag 2 through the gas inlet port 2i, the sheets 6a of the check valve 6 overlap with each other, as shown in FIG. 3(b), thereby preventing the gas from flowing out of the inner bag 2.

In the side airbag system with such a structure, when a car is in a side collision or roll over, the gas generator 3 is actuated to eject the gas. The gas flows into the inner bag 2 from the gas generator 3 to inflate the inner bag 2. As shown in FIG. 2(b), the inner bag 2 is inflated at the lower portion of the airbag 1 so that the lower portion of the airbag 1 is inflated up to the same size as that of the inner bag 2. When the inner bag 2 is fully inflated and a gas pressure in the inner bag 2 exceeds a predetermined value, the ring spring 4 does not support the pressure in the inner bag 2, so that the gas inlet port 2i of the inner bag 2 moves away from the gas generator 3, as shown in FIG. 3(b). As a result, the gas from the gas generator 3 flows directly into the airbag 1 to inflate the same into a fully inflated state, as shown in FIGS. 1 and 2(b). The airbag 1 is deployed along the seat 10 adjacent to the window, as shown in FIG. 1.

With the side airbag system described above, the airbag 1 has the vent hole 1h. Therefore, when the occupant plunges into an upper portion of the inflated airbag 1, the gas in the airbag 1 flows out through the vent hole 1h to absorb an impact of the occupant. On the other hand, the check valve 6 closes the gas inlet port 2i of the inner bag 2, so that the gas pressure in the inner bag 2, i.e. the lower portion of the airbag 1, is maintained at a high level. Therefore, when the occupant plunges into the lower portion of the airbag 1, the lower part of the airbag 1 does not contract, thereby holding the lumbar part of the occupant for sufficiently long time.

Figure 5:
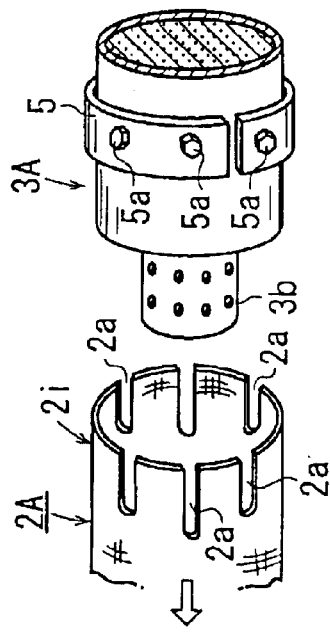
FIG. 5 is a perspective view of a structure for connecting an inner bag and a gas generator of an airbag according to another embodiment.

Another configuration of connecting the inner bag and the gas generator will be described with reference to FIGS. 5, 6(a), and 6(b). As shown in FIG. 5, the gas inlet port 2i of an inner bag 2A has a plurality of slits 2a cut from an edge of the gas inlet port 2i. The gas inlet port 2i is fitted onto a gas generator 3A, and a C-shaped fastening ring 5 is attached onto the gas inlet port 2i. The fastening ring 5 has the same number of bolts 5a as that of the slits 2a, and the bolts 5a pass through the slits 2a in a radial direction. The bolts 5a are screwed in female screw holes (not shown) provided in an outer circumference of the gas generator 3A through the slits 2a. With this configuration, it is possible to control a fastening force of the fastening ring 5. When the gas pressure in the inner bag 2A exceeds a predetermined value, the slits 2a slip off between the fastening ring 5 and the gas generator 3A, thereby separating the inner bag 2A from the gas generator 3A.

Figure 6A:
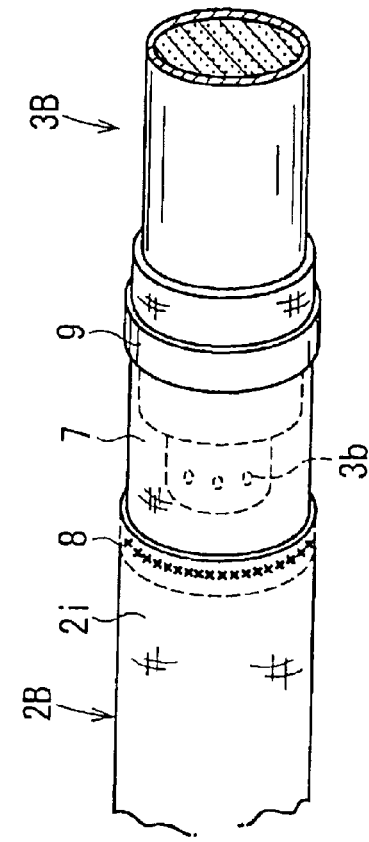
FIGS. 6(a) and 6(b) are perspective views of a structure for connecting an inner bag and a gas generator of an airbag according to another embodiment.

As shown in FIG. 6(a), a cylindrical extension cloth 7 is sewn to the gas inlet port 2i of an inner bag 2B with a tear seam 8. The extension cloth 7 is firmly fastened to a gas generator 3B with a tying band 9. As shown in FIG. 6(b), when the gas pressure in the inner bag 2B exceeds a predetermined value, the tear seam 8 is torn off, so that the inner bag 2B is separated from the extension cloth 7. Reference numeral 8' indicates a torn tear seam.

Figure 6B:
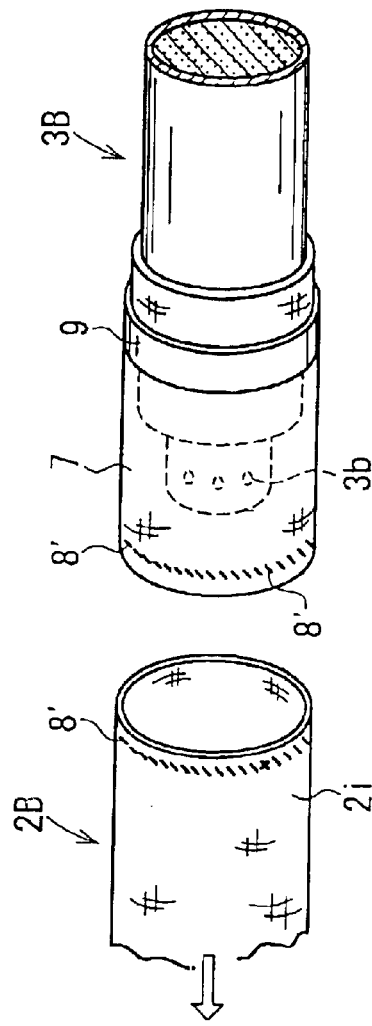
Figure 7:
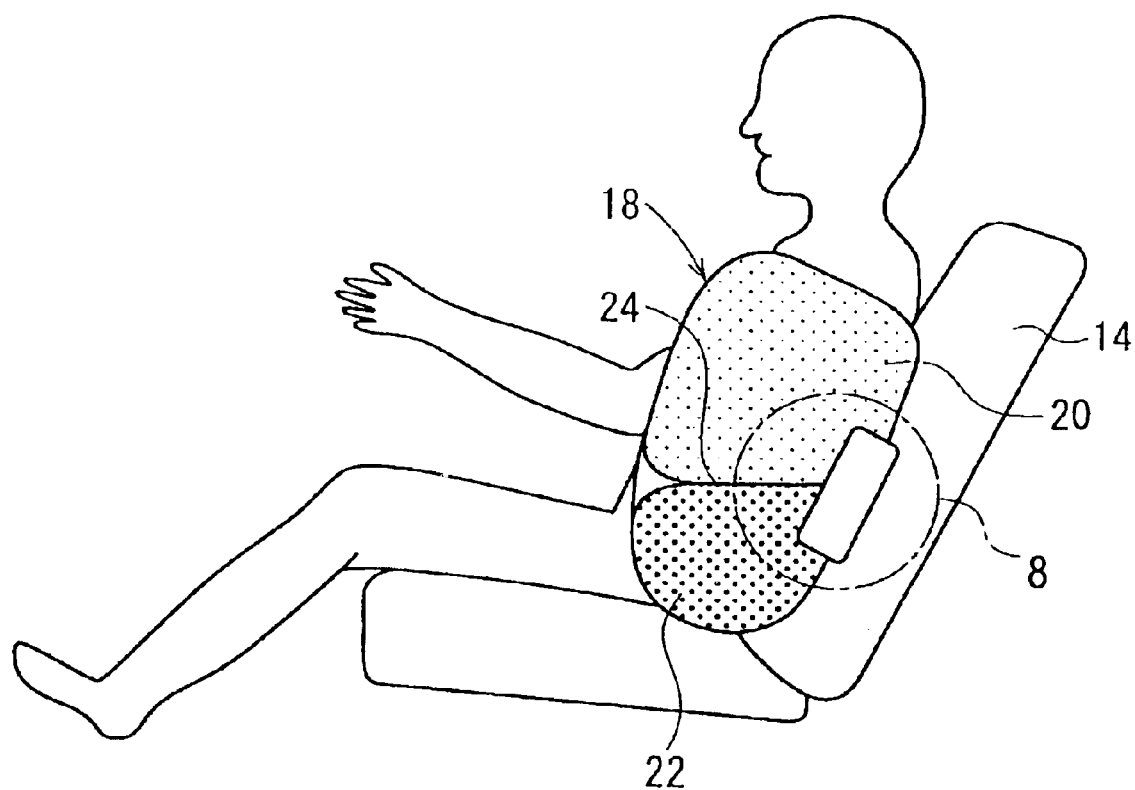
FIG. 7 is a side view of a conventional side airbag system.
Figure 8:
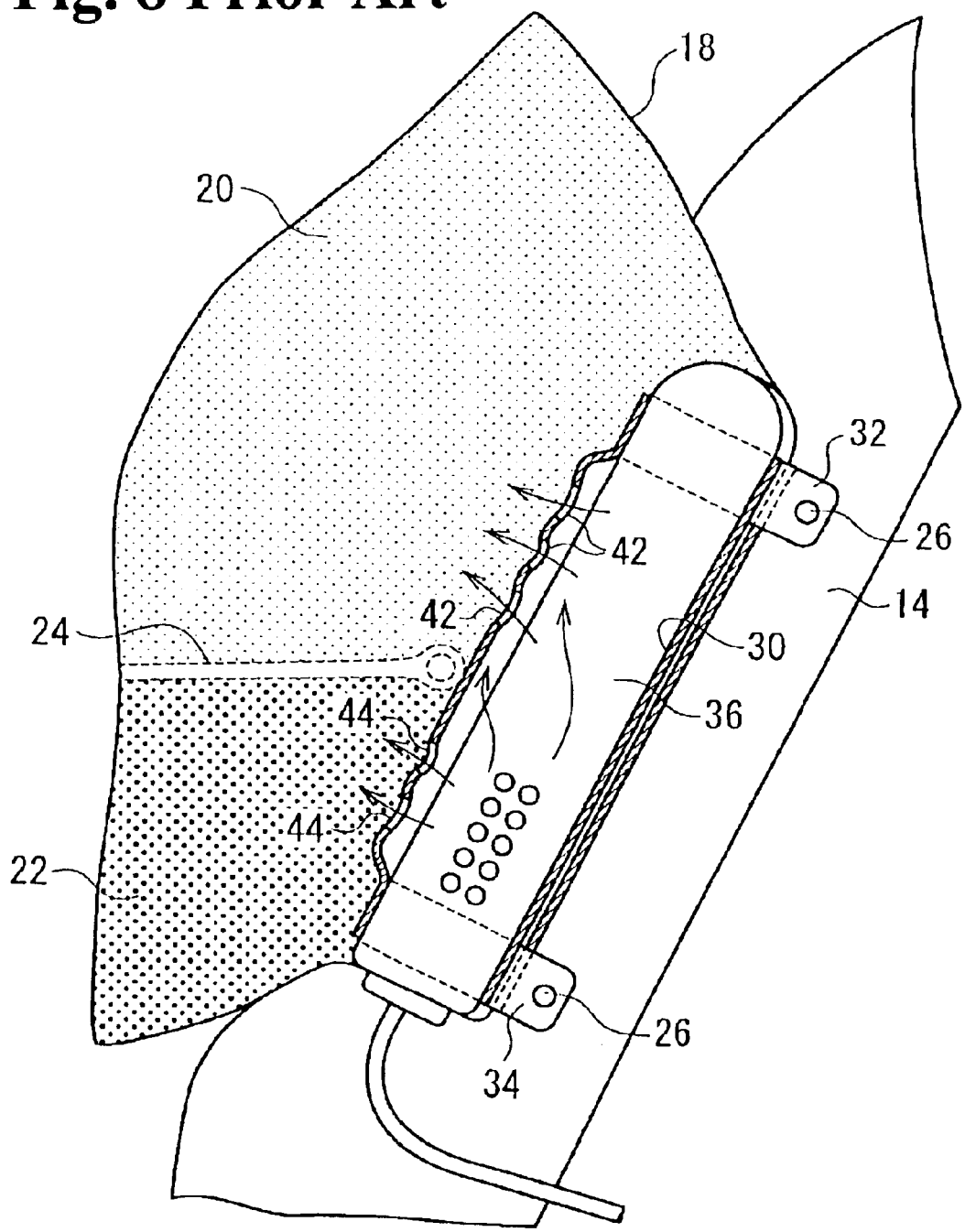
FIG. 8 is a sectional view of the conventional side airbag system shown in FIG. 7.

After the states shown in FIGS. 5 and 6(b), the gas generators 3A and 3B eject the gas directly into the airbag 1 to inflate the same.

As described above, in the airbag system of the present invention, it is possible to maintain the gas pressure in the lower portion of the airbag 1 at a high level for sufficiently long time.

While the invention has been explained with reference to the specific embodiments of the invention, the explanation is illustrative and the invention is limited only by the appended claims.

What is claimed is:

1. An airbag system for protecting an occupant, comprising:

an airbag, an inner bag disposed inside the airbag, a gas generator for generating gas to inflate the airbag and the inner bag, means for first providing the gas to the inner bag connected to the gas generator, said providing means providing the gas between the airbag and the inner bag to inflate the airbag after the inner bag is inflated, and a check valve attached to the inner bag for preventing the gas from flowing out of the inner bag into the airbag when the inner bag is inflated.

2. An airbag system according to claim 1, wherein said providing means is a connection device for connecting the inner bag to the gas generator, said connection device disconnecting the inner bag from the gas generator when a gas pressure in the inner bag exceeds a predetermined value so that the gas generator supplies the gas only to the airbag.

3. An airbag system according to claim 2, wherein said connection device is attached to the gas generator so that said connection device is detached from the gas generator when the gas pressure in the inner bag exceeds the predetermined value.

4. An airbag system according to claim 2, wherein said connection device is an extended portion of the inner bag having a tear seam, said extended portion separating from the inner bag when the inner pressure in the inner bag exceeds the predetermined value to break the tear seam.

5. An airbag system according to claim 2, wherein said connection device is an elastic member for pressing the inner bag against the gas generator.

6. An airbag system according to claim 1, wherein said inner bag is disposed at a lower portion of the airbag.

* * * * *